(12) United States Patent
Leise et al.

(10) Patent No.: US 10,679,438 B1
(45) Date of Patent: Jun. 9, 2020

(54) METHOD AND SYSTEM FOR RECEIVING AND DISPLAYING USER PREFERENCES CORRESPONDING TO A VEHICLE EVENT

(71) Applicant: State Farm Mutual Automobile Insurance Company, Bloomington, IL (US)

(72) Inventors: William J. Leise, Normal, IL (US); Douglas Albert Graff, Mountain View, MO (US); Christina P. Mullen, Waterford, VA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 172 days.

(21) Appl. No.: 15/964,351

(22) Filed: Apr. 27, 2018

Related U.S. Application Data (63) Continuation of application No. 15/206,869, filed on Jul. 11, 2016, now Pat. No. 10,002,473.

(51) Int. Cl.
*G07C 5/08* (2006.01)
*G06Q 40/08* (2012.01)
*G07C 5/00* (2006.01)

(52) U.S. Cl.
CPC ........... *G07C 5/0825* (2013.01); *G06Q 40/08* (2013.01); *G07C 5/006* (2013.01); *G07C 5/008* (2013.01); *G07C 5/0808* (2013.01)

(58) Field of Classification Search
CPC ...... G07C 5/0825; G07C 5/006; G07C 5/008; G07C 5/0808; G06Q 40/08
See application file for complete search history.

(56) References Cited

U.S. PATENT DOCUMENTS

| | | |
|---|---|---|
| 5,317,503 A | 3/1994 | Inoue |
| 5,839,112 A | 11/1998 | Schreitmueller |
| | (Continued) | |

OTHER PUBLICATIONS

White et. al., "Automatic Traffic Accident Detection and Notification with Smartphones", published Mar. 22, 2011, all pages, retrieved from https://dl.acm.org/citation.cfm?id=1997797 (Year: 2011).*

*Primary Examiner* — Calvin Cheung
(74) *Attorney, Agent, or Firm* — Marshall, Gerstein & Borun LLP (57) ABSTRACT

The present disclosure generally relates to displaying user preferences related to operation of a vehicle. For example, the associated systems and methods may include receiving a user's personal information and preferences and displaying them on an in-vehicle infotainment system or a mobile device application. More particularly, the user may input her automobile insurance provider, health insurance provider, medical information, a preferred repair facility or mechanic, a preferred towing company, a preferred hospital, an emergency contact number, the user's blood type, etc. The user preferences may be stored and displayed on the in-vehicle infotainment system or the mobile device application. Furthermore, the in-vehicle infotainment system or the mobile device application may receive vehicle diagnostic information from the vehicle, and display user preferences based on the diagnostic information. For example, if the diagnostic information indicates the user needs an oil change and the user's preferred mechanic is Jiffy Lube, the in-vehicle infotainment system or the mobile device application may display the three nearest Jiffy Lubes.

20 Claims, 3 Drawing Sheets

(56) References Cited

U.S. PATENT DOCUMENTS

| | | |
|---|---|---|
| 5,950,169 A | 9/1999 | Borghesi |
| 6,434,455 B1 | 8/2002 | Snow |
| 6,885,981 B2 | 4/2005 | Bomar, Jr. |
| 7,636,676 B1 | 12/2009 | Wolery |
| 8,265,963 B1 | 9/2012 | Hanson |
| 8,755,779 B1 | 6/2014 | Burks |
| 8,799,034 B1 | 8/2014 | Brandmaier |
| 9,773,281 B1* | 9/2017 | Hanson .................. G06Q 40/08 |
| 2002/0055861 A1 | 5/2002 | King |
| 2003/0009270 A1 | 1/2003 | Breed |
| 2004/0233077 A1 | 11/2004 | Mizusawa |
| 2005/0060070 A1 | 3/2005 | Kapolka |
| 2005/0176403 A1* | 8/2005 | Lalos ................... G08B 25/016 |
| | | 455/404.1 |
| 2006/0143162 A1 | 6/2006 | Bernacki |
| 2007/0203866 A1 | 8/2007 | Kidd |
| 2007/0233341 A1 | 10/2007 | Logsdon |
| 2010/0205450 A1 | 8/2010 | Sarnacke |
| 2010/0280956 A1 | 11/2010 | Chutorash |
| 2011/0040578 A1 | 2/2011 | Ramsey |
| 2011/0202374 A1 | 2/2011 | Vahidi |
| 2011/0254676 A1 | 10/2011 | Marumoto |
| 2011/0276219 A1 | 11/2011 | Swaminathan |
| 2012/0209634 A1 | 8/2012 | Ling |
| 2013/0046432 A1 | 2/2013 | Edwards |
| 2013/0078942 A1* | 3/2013 | Owens .................... H04W 4/12 |
| | | 455/404.2 |
| 2013/0158778 A1 | 6/2013 | Tengler |
| 2014/0309891 A1 | 4/2014 | Ricci |
| 2014/0210644 A1 | 7/2014 | Breed |
| 2014/0277916 A1 | 9/2014 | Mullen |
| 2015/0120082 A1* | 4/2015 | Cuddihy ................ G07C 5/008 |
| | | 701/1 |
| 2015/0187146 A1* | 7/2015 | Chen ..................... G07C 5/008 |
| | | 701/31.5 |
| 2015/0188961 A1 | 7/2015 | Ricci |
| 2017/0101093 A1 | 4/2017 | Barfield, Jr. |
| 2017/0108342 A1* | 4/2017 | Foreman ............... G08G 1/205 |

* cited by examiner

METHOD AND SYSTEM FOR RECEIVING AND DISPLAYING USER PREFERENCES CORRESPONDING TO A VEHICLE EVENT

RELATED APPLICATIONS

This application is continuation of and claims the benefit of U.S. patent application Ser. No. 15/206,869, entitled "Method and System for Receiving and Displaying User Preferences Corresponding to a Vehicle Event," and filed on Jul. 11, 2016.

TECHNICAL FIELD

The present disclosure generally relates to methods and systems to display user preferences associated with operation of a vehicle. More particularly, the present disclosure relates to receiving user preferences and displaying a user preference based on a respective vehicle event.

BACKGROUND

Vehicle operators (e.g., vehicle drivers) often require access to personal information and preferences (e.g., automobile insurance provider, health insurance provider, medical information, a preferred repair facility or mechanic, a preferred towing company, a preferred hospital, an emergency contact number, the user's blood type, etc.). The personal information and preferences may be associated with particular vehicle related events (e.g., vehicle diagnostic information indicative of the vehicle needing an oil change, vehicle diagnostic information indicative of the vehicle being involved in an accident, vehicle diagnostic information indicative of the vehicle being disabled, etc.). It is understood that personal information and preferences may be updated periodically, based on the vehicle operator's preference.

For example, if the diagnostic information of a vehicle indicates the user needs an oil change, the vehicle operator may desire information related to a particular oil change facility. If the vehicle operator is involved in an accident, tow-truck and/or hospital information may be desired.

Currently, vehicle operators need to access the above information manually each time the information is desired. Thus, there are deficiencies associated with access to the associated information.

SUMMARY

Systems and methods are provided for generating personal information displays. The systems and methods may improve a vehicle operator's access to personal information based upon, for example, vehicle diagnostic data.

In one aspect, a device for automatically receiving personal information related to operation of a vehicle may include a personal information and preference data receiving module stored on a memory that, when executed by a processor of a computing device, causes the processor to receive personal information and preference data. The personal information and preference data may be representative of personal information and preferences of an individual. The device may also include a vehicle diagnostics data receiving module stored on a memory that, when executed by a processor of a computing device, causes the processor to receive vehicle diagnostic data. The vehicle diagnostic data may be representative of operation of a vehicle. The device may further include an information display generation module stored on a memory that, when executed by a processor of a computing device, may cause the processor to automatically generate an information display, based upon the personal information and preferences data and the vehicle diagnostic data.

In another aspect, a computer implemented method for automatically receiving personal information related to operation of a vehicle may include receiving personal information and preference data, at a processor, in response to the processor executing a personal information and preference data receiving module. The personal information and preference data may be representative of personal information and preferences of an individual. The method may also include receiving vehicle diagnostics data, at a processor, in response to the processor executing a vehicle diagnostics data receiving module. The vehicle diagnostic data may be representative of operation of a vehicle. The method may further include automatically generating an information display based upon the personal information and preferences data and the vehicle diagnostic data, using a processor, in response to the processor executing an information display generation module.

In a further aspect, a non-transitory computer-readable medium storing instructions that, when executed by a processor of a computing device, may cause the processor to automatically display personal information related to operation of a vehicle may include a personal information and preference data receiving module that, when executed by a processor of a computing device, causes the processor to receive personal information and preference data. The personal information and preference data is representative of personal information and preferences of an individual. The non-transitory computer-readable medium may also include a vehicle diagnostics data receiving module that, when executed by a processor of a computing device, causes the processor to receive vehicle diagnostic data. The vehicle diagnostic data may be representative of operation of a vehicle. The non-transitory computer-readable medium may further include an information display generation module that, when executed by a processor of a computing device, causes the processor to automatically generate an information display, based upon the personal information and preferences data and the vehicle diagnostic data.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present disclosure generally relates to displaying user preferences related to operation of a vehicle. For example, the associated systems and methods may include receiving a user's personal information and preferences and displaying them on an in-vehicle infotainment system or a mobile device application. More particularly, the user may input her automobile insurance provider, health insurance provider, medical information, a preferred repair facility or mechanic, a preferred towing company, a preferred hospital, an emergency contact number, the user's blood type, etc. The user preferences may be stored and displayed on the in-vehicle infotainment system or the mobile device application. Furthermore, the in-vehicle infotainment system or the mobile device application may receive vehicle diagnostic information from the vehicle, and display user preferences based on the diagnostic information. For example, if the diagnostic information indicates the user needs an oil change and the user's preferred mechanic is Jiffy Lube, the in-vehicle infotainment system or the mobile device application may display the three nearest Jiffy Lubes.

By automatically displaying user preferences associated with operation of vehicles, the systems and methods of the present disclosure reduce computer memory requirements and computer processing requirements. Additionally, the systems and methods improve accuracy and availability of associated information.

While the systems and methods of the present disclosure may generate and transmit insurance policy related data, that is representative of personal information and individual insurance information, the systems and methods may include an "opt-in" feature that enables any given individual to select a content of any insurance policy related data. Furthermore, the systems and methods may automatically exclude all personal information and individual insurance policy information from the insurance policy related data. For example, the systems and methods may generate insurance policy related data that only includes an indication as to whether any given vehicle is equipped with an automatic personal information display generation device.

In certain aspects, the present embodiment may provide benefits to insurance providers and insurance customers, such as to lessen the amount of damage that results from insurance-related events, such as vehicle accidents, etc. Emergency responders may arrive on the scene of an insurance-related event quicker, and thus taken prompt action to lessen damage. The functionality described herein may be used to adjust or update insurance policies, such as adjust or update insurance premiums, rates, discounts, risk levels, etc. associated with auto and/or other types of insurance based upon an insured having one or more of the functionalities or capabilities discussed herein.

Figure 1:
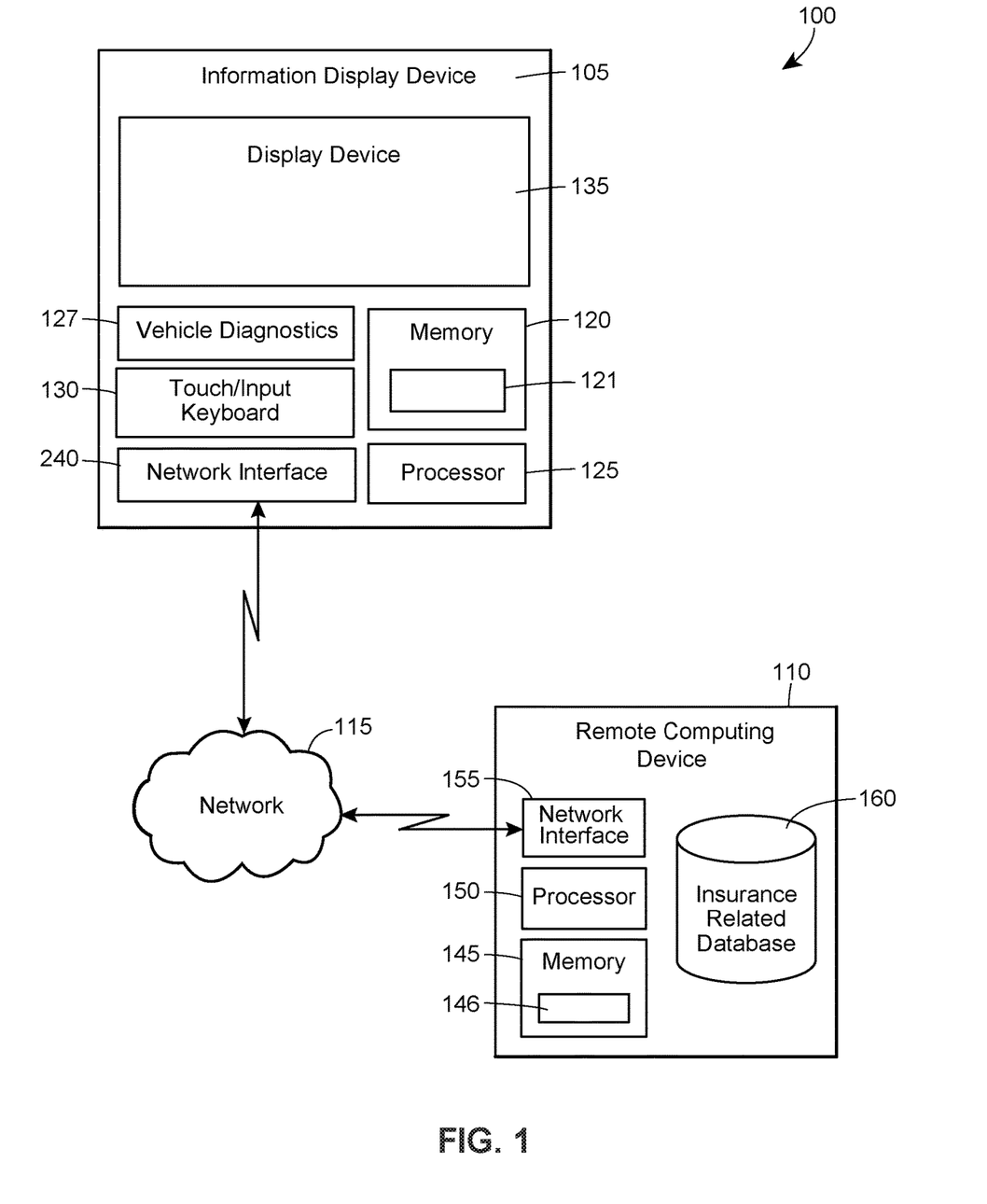
FIG. 1 depicts a high-level block diagram for displaying user preferences related to operating a vehicle.

Exemplary System for Automatically Generating Personal Preference Information Displays Turning to FIG. 1, a computer system for automatically generating personal information displays 100 may include a personal information display device 105 in communication with a remote computing device 110 via a communications network 115. The computer system 100 may implement communications between the personal information display generation device 105 and the remote computing device 110 to provide, for example, personal information and preference data to an insurance database 160. For example, the computer system 100 may acquire personal information and preference data and vehicle diagnostic information data from, for example, a user of a personal information display generation device 105. As described in detail herein, the computer system 100 may automatically generate personal information displays based upon, for example, the personal information and preference data, and the vehicle diagnostic data.

For clarity, only one personal information display generation device 105 and one remote computing device 110 are depicted in FIG. 1. While FIG. 1 depicts only one personal information display generation device 105 and one remote computing device 110, it should be understood that any number of personal information display generation devices 105 and any number of remote computing devices may be supported, and that each personal information display generation device 105 and each remote computing device 110 may be any appropriate computing device, such as a mobile telephone, a personal data assistant, a tablet or a lap-top computer.

A personal information display generation device 105 may include a memory 120 and a processor 125 for storing and executing, respectively, a module 121. The module 121, stored in the memory 120 as a set of computer-readable instructions, may be related to an application for automatically generating personal information displays that, when executed on processor 125, may cause the processor 125 to generate personal information displays based upon personal information and preference data, and vehicle diagnostic data. As described in detail herein, the module 121 may facilitate interaction between an associated personal information display generation device 105 and a remote computing device 110. The processor 125, further executing the module 121, may facilitate communications between a remote computing device 110 and a personal information display generation device 105 via a network interface 140 and a network 215.

A personal information display device 105 may include a vehicle diagnostic device 127 (e.g., a vehicle body controller). A personal information display generation device 105 may include a display device 135 which may be any type of electronic display device such as a liquid crystal display (LCD), a light emitting diode (LED) display, a plasma display, a cathode ray tube (CRT) display, or any other type of known or suitable electronic display. A display device 135 may exhibit a display which depicts a user interface for configuring personal information display generation device 105 to communicate with a remote computing device 110. A personal information display generation device 105 may include a user input device 130, such as a touch input/ keyboard/pointing device (e.g., a mouse) that provides a mechanism for a user of the personal information display generation device 105 to launch an automatic personal information display generation application and, for example, to interact with a system for automatically generating personal information displays. The user input device 130 may be configured as an integral part of a display device 135, such as a touch screen display device.

The network interface 140 may be configured to facilitate communications between a personal information display generation device 105 and a remote computing device 110 via any wireless communication network 115, including for example a peer-to-peer communications link, wireless LAN, MAN or WAN, WiFi, the Internet, or any combination thereof. Moreover, a personal information display generation device 105 may be communicatively connected to a remote computing device 110 via any suitable communication system, such as via any publicly available or privately owned communication network, including those that use wireless communication structures, such as wireless communication networks, including for example, a peer-to-peer communications link, wireless LANs and WANs, satellite and cellular telephone communication systems, etc. A personal information display generation device 105 may cause, for example, personal information display data to be transmitted to, and stored in, for example, a remote computing device 110 memory 145 and/or a remote insurance database 160.

A remote computing device 110 may include a memory 145 and a processor 150 for storing and executing, respectively, a module 146. The module 146, stored in the memory 145 as a set of computer-readable instructions, may facilitate applications related to automatically generating personal information displays based upon, for example, personal information and preference data, vehicle diagnostic data, and/or geographic map data. The module 146 may also facilitate communications between the remote computing device 110 and a personal information display generation device 105 via a network interface 155 and the network 115, and other functions and instructions.

A remote computing device 110 may be communicatively coupled to an insurance database 160. While the insurance database 160 is shown in FIG. 1 as being communicatively coupled to the remote computing device 110, it should be understood that the insurance database 160 may be located within separate remote servers (or any other suitable computing devices) communicatively coupled to the remote computing device 110. Optionally, portions of insurance database 160 may be associated with memory modules that are separate from one another, such as a memory 120 of a personal information display generation device 105.

Figure 2:
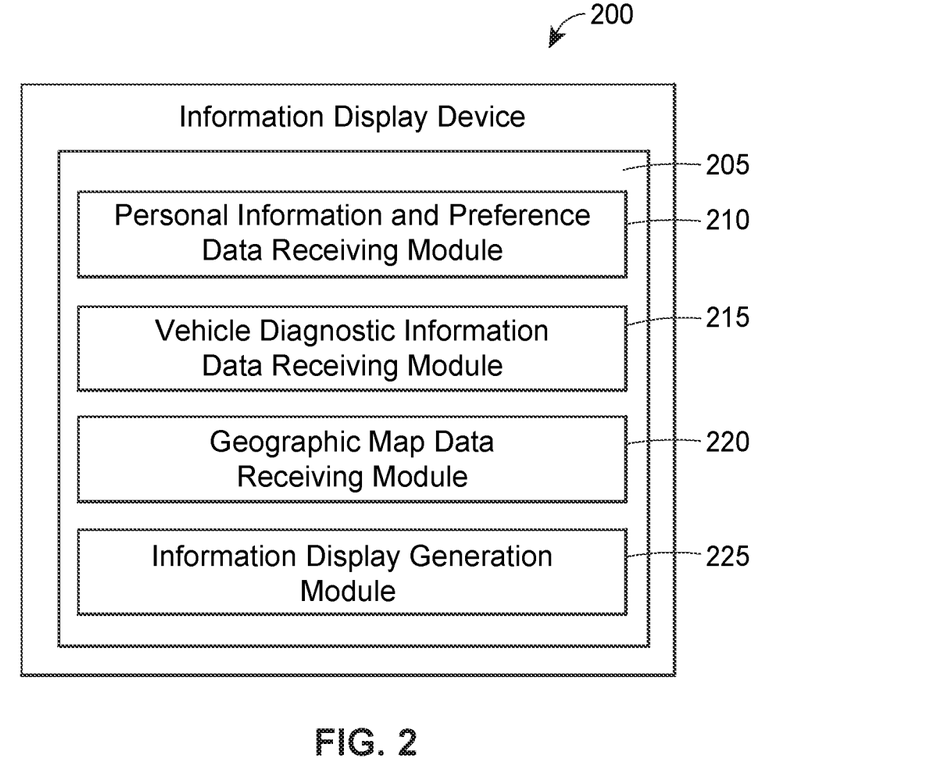
FIG. 2 depicts a block diagram for an exemplary display device for displaying user preferences related to operating a vehicle.

Exemplary Personal Information Display Generation Device for Automatically Generating Personal Preference Information Displays Turning to FIG. 2, a personal information display generation device 200 may include a personal information and preferences data receiving module 210, a vehicle diagnostic data receiving module 215, a geographic map data receiving module 220, and/or an information display generation module 225 stored on, for example, a memory 205. The personal information display generation device 200 may be similar to the personal information display generation device 105 of FIG. 1, and/or may include additional, less, or alternate functionality, including that discussed elsewhere herein.

Figure 3:
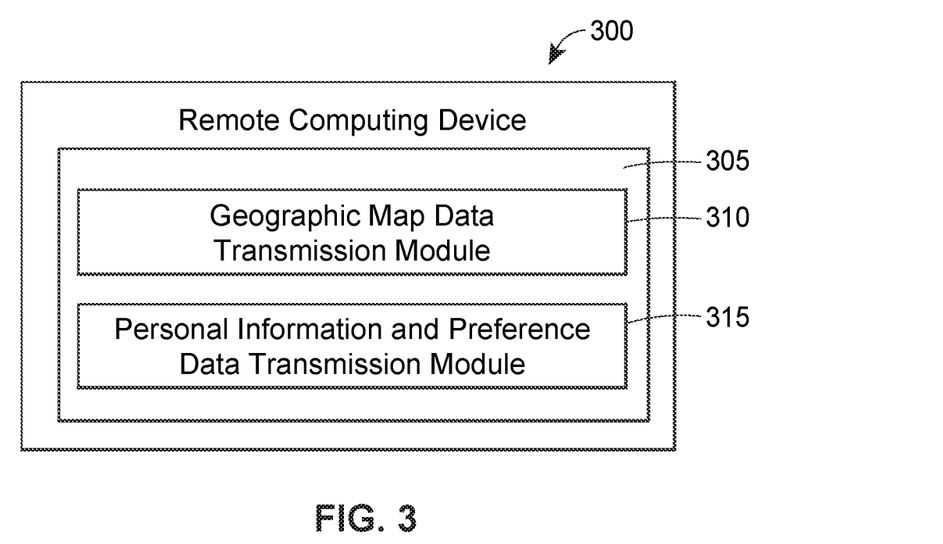
FIG. 3 depicts a block diagram for a remote computing device for displaying user preferences related to operating a vehicle.

Exemplary Remote Computing Device for Automatically Generating Personal Preference Information Displays With reference to FIG. 3, a remote computing device 300 may include a geographic map data transmission module 310 and/or a personal information and preference data transmission module 315 stored on, for example, a memory 305. The remote computing device 300 may be similar to, for example, the remote computing device 110 of FIG. 1, and/or may include additional, less, or alternate functionality, including that discussed elsewhere herein.

Figure 4:
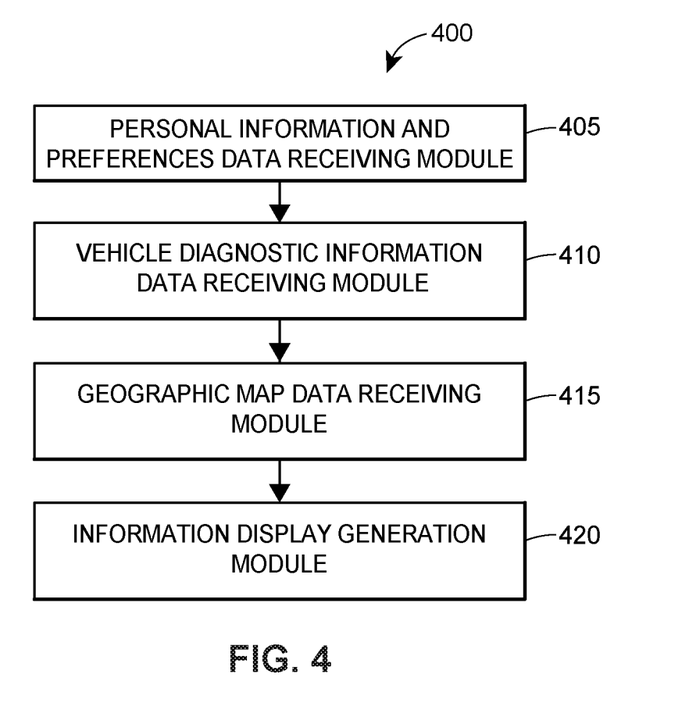
FIG. 4 depicts a flow diagram for an exemplary method for displaying user preferences related to operating a vehicle.

Exemplary Method for Automatically Generating Personal Preference Information Displays Turning to FIG. 4, a method of automatically generating personal information displays 400 may be implemented by a processor (e.g., processor 125 of personal information display generation device 105 of FIG. 1) executing, for example, modules 210-225 of FIG. 2. In particular, processor 125 may execute a personal information and preferences data module 210 to receive insurance policy data from, for example, a processor of a remote computing device (e.g., processor 150) (block 405). The personal information and preference data may be, for example, representative of at least one of: an automobile insurance provider, a health insurance provider, medical information, a preferred repair facility or mechanic, a preferred towing company, a preferred hospital, an emergency contact number, a blood type, etc.

The processor 125 may execute a vehicle diagnostic data receiving module 215 to cause the processor 125 to receive vehicle diagnostic data from, for example, a vehicle diagnostic device (e.g., vehicle diagnostic device 127 of FIG. 1) (block 410). The vehicle diagnostic data may be representative of, for example, at least one of: that the vehicle needs an oil change, that a vehicle is disabled, that a vehicle has been involved in an accident, etc.

The processor 125 may execute a geographic map data receiving module 220 to, for example, cause the processor 125 to receive geographic map data from, for example, a processor of a remote computing device (e.g., processor 150) (block 415). The geographic map data may be, for example, representative of a geographic area proximate a vehicle.

The processor 125 may execute an information display generation module 225 to, for example, cause the processor 125 to generate a personal information display based upon, for example, personal information and preference data, vehicle diagnostic data, and/or geographic map data (block 420).

Figure 5:
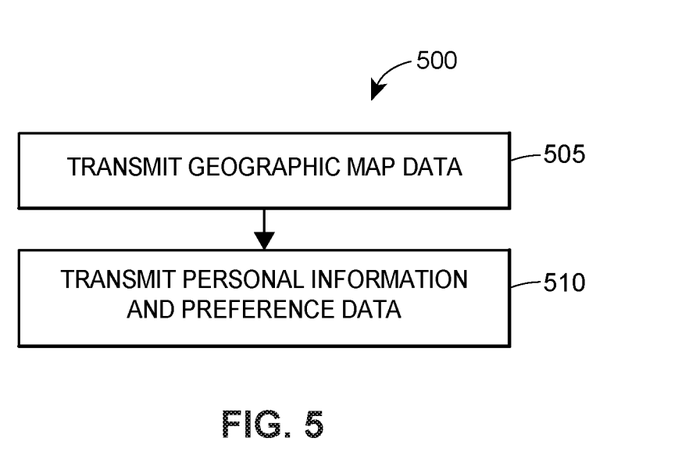
FIG. 5 depicts a flow diagram for an exemplary method for displaying user preferences related to operating a vehicle.

Exemplary Method for Automatically Generating Personal Preference Information Displays With reference to FIG. 5, a method of automatically generating a personal information display 500 may be implemented by a processor (e.g., processor 150 of remote computing device 110 of FIG. 1) executing, for example, modules 310-315 of FIG. 3. In particular, processor 150 may execute a geographic map data transmission module 310 to geographic map data to, for example, a processor of a personal information display generation device (e.g., processor 125 of FIG. 1) (block 505). The processor 150 may execute a personal information and preferences data receiving module 315 to, for example, cause the processor 150 to receive personal information and preferences data from, for example, a personal information display generation device (e.g., personal information display generation device 105 of FIG. 1) (block 510).

Exemplary Computer Implemented Method

In one aspect, a computer implemented method for automatically receiving personal information related to operation of a vehicle may include receiving personal information and preference data, at a processor, in response to the processor executing a personal information and preference data receiving module. The personal information and preference data may be representative of personal information and preferences of an individual. The method may also include receiving vehicle diagnostics data, at a processor, in response to the processor executing a vehicle diagnostics data receiving module. The vehicle diagnostic data may be representative of operation of a vehicle. The method may further include automatically generating an information display based upon the personal information and preferences data and the vehicle diagnostic data, using a processor, in response to the processor executing an information display generation module.

A computer implemented method for automatically receiving personal information related to operation of a vehicle may include receiving geographic map data, at a processor, in response to the processor executing a geographic map data receiving module. The geographic map data may be representative of geographic area proximate the vehicle, and wherein the information display is further based upon the geographic map data. A computer implemented method for automatically receiving personal information related to operation of a vehicle may include personal information and preference data that is representative of at least one of: an automobile insurance provider, a health insurance provider, medical information, a preferred repair facility or mechanic, a preferred towing company, a preferred hospital, an emergency contact number, or a blood type. A computer implemented method for automatically receiving personal information related to operation of a vehicle may include personal information and preference data that is stored on a memory of at least one of: an in-vehicle infotainment system, a mobile device and/or mobile telephone. A computer implemented method for automatically receiving personal information related to operation of a vehicle may include diagnostic information that indicates a vehicle is disabled, and an information display may include information regarding at least one vehicle towing service.

Exemplary Device

A device for automatically receiving personal information related to operation of a vehicle may include a personal information and preference data receiving module stored on a memory that, when executed by a processor of a computing device, causes the processor to receive personal information and preference data. The personal information and preference data may be representative of personal information and preferences of an individual. The device may also include a vehicle diagnostics data receiving module stored on a memory that, when executed by a processor of a computing device, causes the processor to receive vehicle diagnostic data. The vehicle diagnostic data may be representative of operation of a vehicle. The device may further include an information display generation module stored on a memory that, when executed by a processor of a computing device, may cause the processor to automatically generate an information display, based upon the personal information and preferences data and the vehicle diagnostic data.

For instance, the device for automatically receiving personal information related to operation of a vehicle may include a geographic map data receiving module stored on a memory that, when executed by a processor of a computing device, causes the processor to receive geographic data. The geographic map data may be representative of geographic area proximate the vehicle, and wherein the information display is further based upon the geographic map data. A device for automatically receiving personal information related to operation of a vehicle may be either an in-vehicle infotainment system, a mobile device and/or a mobile telephone. A device for automatically receiving personal information related to operation of a vehicle may include personal information and preference data that is representative of at least one of: an automobile insurance provider, a health insurance provider, medical information, a preferred repair facility or mechanic, a preferred towing company, a preferred hospital, an emergency contact number, or a blood type. A device for automatically receiving personal information related to operation of a vehicle may include personal information and preference data that is stored on a memory of at least one of: an in-vehicle infotainment system, a mobile device and/or a mobile telephone. A device for automatically receiving personal information related to operation of a vehicle may include diagnostic information that indicates a vehicle needs an oil change, and an information display may include information regarding at least one oil change provider. A device for automatically receiving personal information related to operation of a vehicle may include diagnostic information that indicates a vehicle is disabled, and an information display may include information regarding at least one vehicle service provider.

Exemplary Computer-Readable Instructions

A non-transitory computer-readable medium storing instructions that, when executed by a processor of a computing device, may cause the processor to automatically display personal information related to operation of a vehicle may include a personal information and preference data receiving module that, when executed by a processor of a computing device, causes the processor to receive personal information and preference data. The personal information and preference data is representative of personal information and preferences of an individual. The non-transitory computer-readable medium may also include a vehicle diagnostics data receiving module that, when executed by a processor of a computing device, causes the processor to receive vehicle diagnostic data. The vehicle diagnostic data may be representative of operation of a vehicle. The non-transitory computer-readable medium may further include an information display generation module that, when executed by a processor of a computing device, causes the processor to automatically generate an information display, based upon the personal information and preferences data and the vehicle diagnostic data.

A non-transitory computer-readable medium storing instructions that, when executed by a processor of a computing device, may cause the processor to automatically display personal information related to operation of a vehicle may include a geographic map data receiving module that, when executed by a processor of a computing device, may cause the processor to receive geographic data. The geographic map data is representative of geographic area proximate the vehicle, and an information display may be further based upon the geographic map data. A non-transitory computer-readable medium storing instructions that, when executed by a processor of a computing device, may cause the processor to automatically display personal information related to operation of a vehicle may include device that is either an in-vehicle infotainment system, mobile device and/or a mobile telephone. A non-transitory computer-readable medium storing instructions that, when executed by a processor of a computing device, may cause the processor to automatically display personal information related to operation of a vehicle may include personal information and preference data that is representative of at least one of: an automobile insurance provider, a health insurance provider, medical information, a preferred repair facility or mechanic, a preferred towing company, a preferred hospital, an emergency contact number, or a blood type. A non-transitory computer-readable medium storing instructions that, when executed by a processor of a computing device, may cause the processor to automatically display personal information related to operation of a vehicle may include personal information and preference data that is stored on a memory of at least one of: an in-vehicle infotainment system, mobile device and/or a mobile telephone. A non-transitory computer-readable medium storing instructions that, when executed by a processor of a computing device, may cause the processor to automatically display personal information related to operation of a vehicle may include diagnostic information that indicates the vehicle needs an oil change, and an information display may include information regarding at least one oil change provider. A non-transitory computer-readable medium storing instructions that, when executed by a processor of a computing device, may cause the processor to automatically display personal information related to operation of a vehicle may include diagnostic information that indicates a vehicle is disabled, and an information display may include information regarding at least one vehicle service provider. A non-transitory computer-readable medium storing instructions that, when executed by a processor of a computing device, may cause the processor to automatically display personal information related to operation of a vehicle may include diagnostic information that indicates a vehicle was involved in an accident, and an information display may include information regarding at least one hospital.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computing device for automatically receiving personal information associated with vehicle collisions, the computing device comprising:
   a processor;
   a memory;
   an opt-in data receiving module stored on the memory that, when executed by the processor of a computing device, causes the processor to receive opt-in data, wherein the opt-in data is representative of whether an associated individual has selected to opt-in to allow personal information and preference data to be provided to an emergency responder,
   a personal information and preference data receiving module stored on the memory that, when executed by the processor of the computing device, causes the processor to receive personal information and preference data, the personal information and preference data being representative of at least one of: medical information, a preferred hospital, or a blood type;
   a vehicle diagnostics data receiving module stored on the memory that, when executed by the processor of the computing device, causes the processor to receive vehicle diagnostic data, the vehicle diagnostic information being indicative of the vehicle being involved in an accident; and
   an information display generation module stored on the memory that, when executed by the processor of the computing device, causes the processor to automatically generate an information display for the emergency responder when an individual associated with the personal information is incapacitated and only when the opt-in data indicates that the individual has selected to opt-in to allow personal information and preference data to be provided to the emergency responder, based upon (i) the personal information and preferences data, and (ii) the vehicle diagnostic data.

2. The computing device of claim 1, further comprising:
   a geographic map data receiving module stored on the memory that, when executed by the processor of the computing device, causes the processor to receive geographic data, wherein the geographic map data is representative of geographic area proximate the vehicle, and wherein the information display is further based upon the geographic map data.

3. The computing device of claim 1, wherein the computing device is either an in-vehicle infotainment system or a mobile telephone.

4. The computing device of claim 3, wherein the personal information and preference data is further representative of personal information and preferences of an individual.

5. The computing device of claim 3, wherein the vehicle diagnostic data is further representative of operation of a vehicle.

6. The computing device of claim 1, wherein the personal information and preference data is representative of at least one of: an automobile insurance provider, a preferred repair facility or mechanic, or an emergency contact number.

7. The computing device of claim 1, wherein the personal information and preference data is stored on a memory of at least one of an in-vehicle infotainment system, a mobile device, or a mobile telephone.

8. The computing device of claim 1, wherein the diagnostic information indicates the vehicle needs an oil change, and the information display includes information regarding at least one oil change provider.

9. The computing device of claim 1, wherein the diagnostic information indicates the vehicle is disabled, and the information display includes information regarding at least one vehicle service provider.

10. A computer-implemented method for automatically receiving personal information associated with vehicle operation, the method comprising:
   receiving opt-in data, at a processor, in response to the processor executing an opt-in data receiving module, wherein the opt-in data is representative of whether an associated individual has selected to opt-in to allow personal information and preference data to be provided to an emergency responder,
   receiving personal information and preference data, at a processor, in response to the processor executing a personal information and preference data receiving module, the personal information and preference data being representative of at least one of: medical information, a preferred hospital, or a blood type;
   receiving vehicle diagnostics data, at a processor, in response to the processor executing a vehicle diagnostics data receiving module, the vehicle diagnostic information being indicative of the vehicle being involved in an accident; and
   automatically generating an information display for the emergency responder when an individual associated with the personal information is incapacitated and only when the opt-in data indicates that the individual has selected to opt-in to allow personal information and preference data to be provided to the emergency responder, based upon (i) the personal information and preferences data, and (ii) the vehicle diagnostic data, in response to the processor executing an information display generation module.

11. The computer-implemented method of claim 10, further comprising:
   receiving geographic map data, at a processor, in response to the processor executing a geographic map data receiving module, wherein the geographic map data is representative of geographic area proximate the vehicle, and wherein the information display is further based upon the geographic map data.

12. The computer-implemented method of claim 10, wherein the personal information and preference data is representative of at least one of: an automobile insurance provider, a preferred repair facility or mechanic, or an emergency contact number.

13. The computer-implemented method of claim 10, wherein the personal information and preference data is stored on a memory of at least one of: an in-vehicle infotainment system, a mobile device, or a mobile telephone.

14. The computer-implemented method of claim 10, wherein the diagnostic information indicates the vehicle is disabled, and the information display includes information regarding at least one vehicle towing service.

15. A non-transitory computer-readable medium storing instructions that, when executed by a processor of a computing device, causes the processor to automatically display personal information associated vehicle operation, the non-transitory computer-readable medium comprising:
   an opt-in data receiving module that, when executed by a processor of a computing device, causes the processor to receive opt-in data, wherein the opt-in data is representative of whether an associated individual has selected to opt-in to allow personal information and preference data to be provided to an emergency responder,
   a personal information and preference data receiving module that, when executed by the processor of the computing device, causes the processor to receive personal information and preference data, the personal information and preference data being representative of at least one of: medical information, a preferred hospital, or a blood type;
   a vehicle diagnostics data receiving module that, when executed by the processor of the computing device, causes the processor to receive vehicle diagnostic data, the vehicle diagnostic information being indicative of the vehicle being involved in an accident; and
   an information display generation module that, when executed by the processor of the computing device, causes the processor to automatically generate an information display for the emergency responder when an individual associated with the personal information is incapacitated and only when the opt-in data indicates that the individual has selected to opt-in to allow personal information and preference data to be provided to the emergency responder, based upon (i) the personal information and preferences data, and (ii) the vehicle diagnostic data.

16. The non-transitory computer-readable medium of claim 15, further comprising:
   a geographic map data receiving module that, when executed by the processor of the computing device, causes the processor to receive geographic data, wherein the geographic map data is representative of a geographic area proximate the vehicle, and wherein the information display is further based upon the geographic map data.

17. The non-transitory computer-readable medium of claim 15, wherein the device is either an in-vehicle infotainment system, a mobile device, or a mobile telephone.

18. The non-transitory computer-readable medium of claim 15, wherein the personal information and preference data is representative of at least one of: an automobile insurance provider, a preferred repair facility or mechanic, or an emergency contact number.

19. The non-transitory computer-readable medium of claim 15, wherein the diagnostic information indicates the vehicle is disabled, and the information display includes information regarding at least one vehicle service provider.

20. The non-transitory computer-readable medium of claim 15, wherein the diagnostic information indicates the vehicle was involved in an accident, and the information display includes information regarding at least one hospital.

* * * * *